United States Patent
Richard et al.

(10) Patent No.: US 6,289,348 B1
(45) Date of Patent: Sep. 11, 2001

(54) METHOD AND SYSTEM OF ELECTRONICALLY RECEIVING AND PROCESSING MEMBERSHIP INFORMATION OF AN ORGANIZATION

(75) Inventors: Rick Richard, Portland; Victor Prince, Beaverton, both of OR (US)

(73) Assignee: Uplaysports.com, Beaverton, OR (US)

( * ) Notice: Subject to any disclaimer, the term of this patent is extended or adjusted under 35 U.S.C. 154(b) by 0 days.

(21) Appl. No.: 09/246,615

(22) Filed: Feb. 8, 1999

(51) Int. Cl.$^7$ .................................................... G06F 17/30
(52) U.S. Cl. ................. 707/10; 707/1; 707/100; 707/104; 707/200; 705/8; 705/9; 709/203
(58) Field of Search .................. 707/1, 10, 100, 707/104, 200; 709/203; 705/5, 8, 9

(56) References Cited

U.S. PATENT DOCUMENTS

| | | | |
|---|---|---|---|
| 5,846,132 | * 12/1998 | Junkin | 463/42 |
| 5,933,811 | * 8/1999 | Angles et al. | 705/14 |
| 6,023,679 | * 2/2000 | Acebo et al. | 705/5 |
| 6,049,776 | * 4/2000 | Donnelly et al. | 705/8 |
| 6,073,109 | * 6/2000 | Flores et al. | 705/8 |

* cited by examiner

Primary Examiner—Jack Choules
Assistant Examiner—Cheryl Lewis
(74) Attorney, Agent, or Firm—Brian R. Short

(57) ABSTRACT

A group organizational system operational as a computer program on a computer network. The computer network provides communication between a host server and a plurality of remote individual users. The group organizational system includes an organization database, a registrant database and a roster database. The organization database includes information relevant to an organization and predetermined registration qualifications. The registrant database is in communication with the remote users and the host server. The registrant database receives registration information from the remote users. The roster database is in communication with the host server. The host server includes a registration generation program for comparing the registration information of the remote users with the predetermined registration qualifications to determine whether a remote user qualifies as member of the organization. The host server further includes a roster generation program for generating a plurality of rosters including the members of the organization, based upon the registration information of the members of the organization. The group organizational system can further include a schedule database which is in communication with the host server. A schedule generation program for generating a schedule of events of the organization based upon the rosters and predetermined scheduling restraints. The group organizational system further includes a product database. The product database comprising product information about products relevant to the organization. A product generation program which generates a product list based upon the registration information of the remote users and the product information of the product database.

18 Claims, 7 Drawing Sheets

METHOD AND SYSTEM OF ELECTRONICALLY RECEIVING AND PROCESSING MEMBERSHIP INFORMATION OF AN ORGANIZATION

FIELD OF INVENTION

This invention relates generally to a method and system for electronically receiving and processing information from individuals. More particularly, this invention relates to an organizational method and system for receiving information over an electronic network from potential and actual members of an organization, automatically generating membership groupings, automatically generating schedules of organizational events, providing information about products related to the activities of the organization, and automatically notifying the members over the electronic network of the membership groupings, schedules and product information.

BACKGROUND

It is common for organizations, such as sports leagues, to register large numbers of individuals to participate in the activities of the organization. Due to the large number of individuals, coordinating the registration of the individual participants can be time consuming and cumbersome. For example, a typical youth sports league may include over 2000 participants. Registration of the participants requires determination of the age, gender, and address of each of the individual participants. In addition, league organizers must collect league fees. The time required to register the participants and collect the fees can be prohibitively great.

Once all of the participants are registered, the organization (league) must generate team rosters which include all of the participants. Generation of team rosters requires grouping the participants by the above listed factors of age, gender, and address, plus other factors including participant preference and experience.

Once team rosters have been generated, the league organizers must generate game schedules for all of the teams. Generation of schedules requires matching team rosters which fall into similar groupings of participants. Generally, the matching includes configuring the game schedule so that every team roster of a particular grouping plays every other team roster within the grouping. Typically, the generation of schedules also includes consideration of playing field availability, season length, holidays and other time constraints.

Typically, participation in the activities of a sports league requires the purchase of products which are required for participation. For example, participation in a basketball league may require the purchase of proper shoes or athletic apparel. It can be difficult for league administrators to properly advise participants of the required products.

In the case of youth sports leagues, most of the league administration is performed by volunteer parents who only have a limited amount of time to dedicate to league administration. Therefore, league administration resources can be very limited. Typically, it is nearly impossible for a league's limited volunteer staff, using antiquated tools and communication methods, to respond to all participant's requests for league information, questions and concerns.

The administrative efforts required to register participants, collect league fees, generate team rosters, generate team roster schedules, suggest product purchases and answer general questions is enormous. Coupled with the fact that league administrators are typically volunteers with limited amounts of free time and administrative systems, makes league administration nearly impossible.

It is desirable to have a organizational network system which allows a plurality of individuals to easily register as members of an organization. It is desirable that the organizational network system have the capability to receive information from the individual members, and generate membership groupings and generate a schedule of events and activities of the organization based upon the information received, and automatically communicate the groupings and schedule to the members. Additionally, it is desirable that the network system be able to automatically provide the members with information about products which may be useful to the members during the course of the activities of the organization.

SUMMARY OF THE INVENTION

The present invention is an organizational network computer system which allows many individuals to electronically register over a computer network as members of the organization. The organizational network computer system has the capability to receive information over the computer network from the individual members. The information of the individual members is used for automatically generating membership groupings, and generating a schedule of events of the organization. The network computer system can also provide the members with information about products which may be useful to the member during the course of the activities of the organization. The network computer system automatically communicates over the computer network the membership grouping, the schedule of events and the product information.

A first embodiment of this invention includes a group organizational system operational as a computer program on a computer network. The computer network provides communication between a host server and a plurality of remote individual users. The group organizational system includes an organization database, a registrant database and a roster database. The organization database includes information relevant to an organization and predetermined registration qualifications. The registrant database is in communication with the remote users and the host server. The registrant database receives registration information from the remote users. The host server includes a registration generation program for comparing the registration information of the remote users with the predetermined registration qualifications to determine whether a remote user qualifies as a member of the organization. Whether the remote user is qualified as a member of the organization is automatically communicated through the computer network to each of the remote users. The registration database is updated to indicate whether a remote user is qualified as a member of the organization. The host server further includes a roster generation program for generating a plurality of rosters including the members of the organization, based upon the registration information of the members of the organization. The rosters are stored in the roster database. The rosters are automatically communicated through the computer network to the remote users.

A second embodiment is similar to the first embodiment. The second embodiment further includes a schedule database which is in communication with the host server. The host server further includes a schedule generation program for generating a schedule of events of the organization based upon the rosters and predetermined scheduling constraints.

The schedules are automatically communicated through the computer network to the remote users.

A third embodiment is similar to the first embodiment. The third embodiment further includes a product database which is in communication with the host server. The product database includes product information about products relevant to the organization. The host server further includes a product generation program which generates a product list based upon the registration information of the remote users and the product information of the product database. The product list is automatically communicated through the computer network to the remote users.

Other aspects and advantages of the present invention will become apparent from the following detailed description, taken in conjunction with the accompanying drawings, illustrating by way of example the principles of the invention.

DETAILED DESCRIPTION

Figure 1:
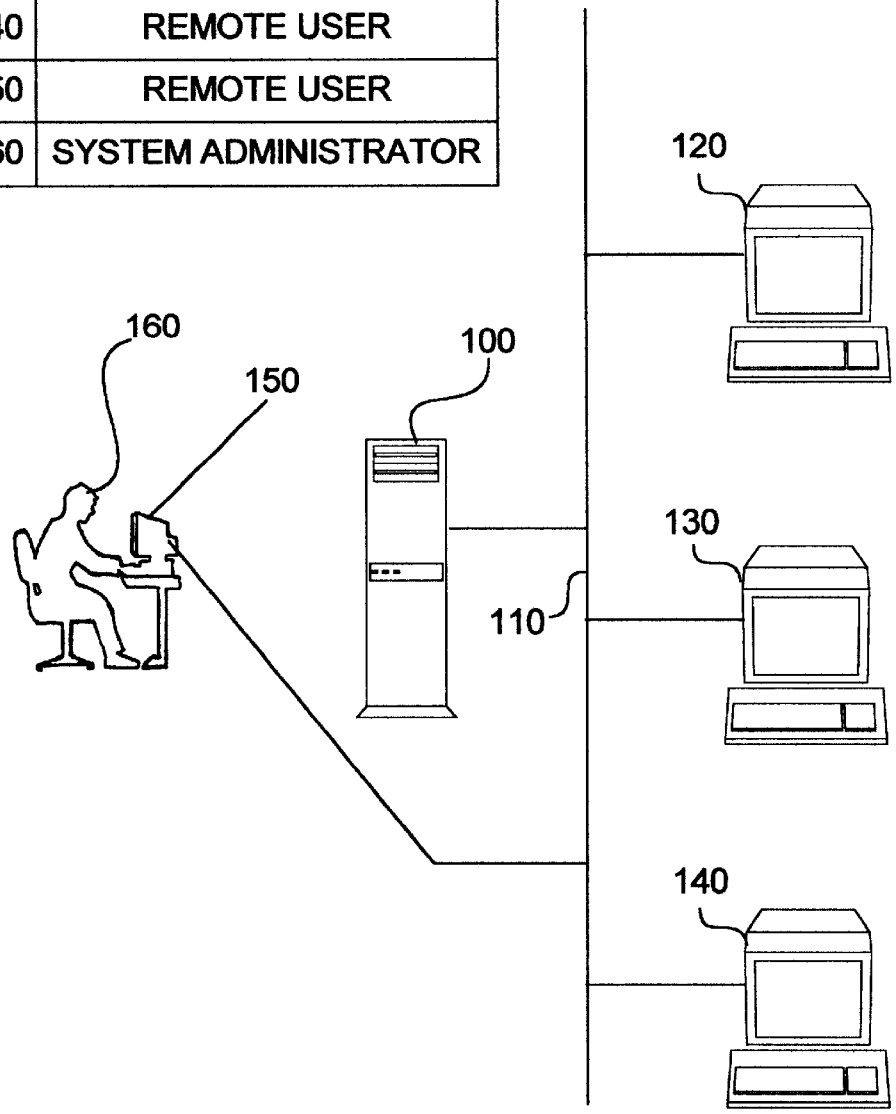
FIG. 1 shows a computer networking system which can be used to implement the system and method of the invention.

As shown in the drawings for purposes of illustration, the invention is embodied in an organizational network computer system and method which allows many individuals to electronically register as members of the organization. The organizational network computer system receives information from the individual members. The information of the individual members is used to automatically generate membership groupings, and generate a schedule of events of the organization. The network computer system can also provide the members with information about products which are useful to the activities of the organization. The network computer system automatically communicates over a computer network the membership groupings, the schedules and the product information.

FIG. 1 shows a computer networking system which can be used to implement the system and method of the invention. The computer networking system includes a host server 100 connected to a network 110 and several remote user terminals 120, 130, 140, 150. A system administrator 160 can enter control parameters and commands directly to the host server 100. FIG. 1 only shows a single system administrator 160. However, the invention can include more than one system administrator 160. The system administrator 160 is distinguished from the remote users in that the system administrator 160 has greater priority in accessing and modifying information within the databases of the computer networking system.

The remote user terminals 120, 130, 140 allow remote users to access computer programs and databases which are controlled by the host server 100 through the network 110. The host server 100 can provide access to information within the databases through a web page which the remote users can access through the network 110. The web page is controlled by the host server 100, and generates a screen view for display to the remote users. During a remote user's web page access, the web page provides menu selections of programs and information relevant to the purposes of the web page. Upon the remote user selection of a menu item, the host server 100 displays on the web page corresponding programs or up-to-date information.

Figure 2:
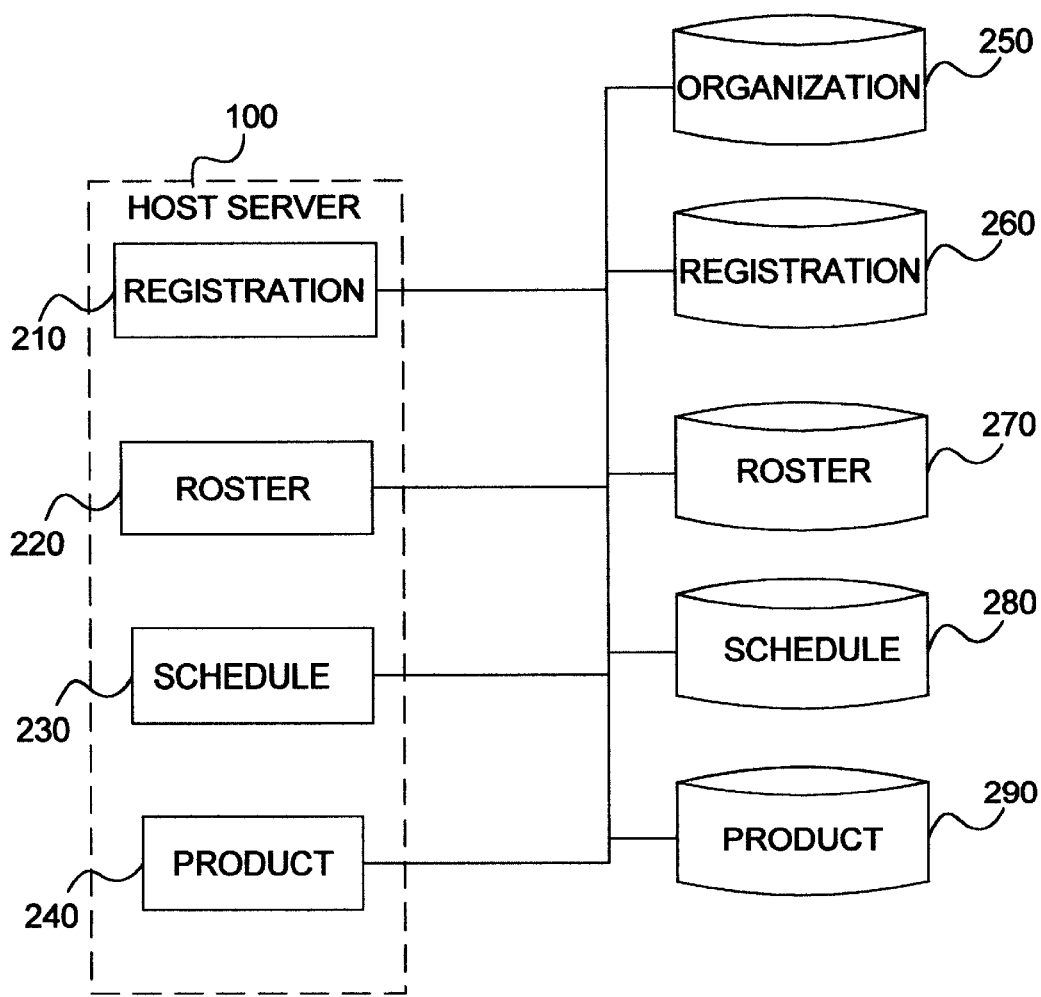
FIG. 2 shows an embodiment of the invention which includes the host server, computer programs according to the invention which run on the host server, and several databases which are accessed by the remote users, remote league administrators and the host server.

FIG. 2 shows an embodiment of the invention which includes the host server 100, computer programs 210, 220, 230, 240 according to the invention which run on the host server 100, and various databases 250, 260, 270, 280, 290 which can be accessed by the remote users and the host server 100.

The computer programs of the invention include a registration qualification program 210, a roster generation program 220, a schedule generation program 230 and a product generation program 240. The databases of the invention include an organization database 250, a registration database 260, a roster database 270, a schedule database 280 and a product database 290.

By way of example, the invention is described through the registration and organization of a sports league. However, it should be understood that this is merely an example of a use of the invention, and that other types of organizations, such as schools, scouts, clubs and others, could equally benefit from the invention.

A first aspect of the invention includes an organizational network computer system and method which allows many individuals to electronically register as members of an organization (such as a sports league). The registration process primarily involves the registration qualification program 210, the organization database 250 and the registration database 260.

The host server 100 receives registration information from remote users, through the network 110. Typically, the information is input to the host server 100 through a web page associated with the organization.

The host server 100 provides information about the league to the remote users through the web page. The league information is generally stored within the organization database 250. The league information is valuable to the remote user because it provides the remote user with descriptions of the organizations involved, the sports offered, the requirements for participation, and league logistics.

The information input by the remote user is generally stored in the registration database 260. Typically, this information includes the remote user's age, gender, address, experience and personal preferences.

Figure 3:
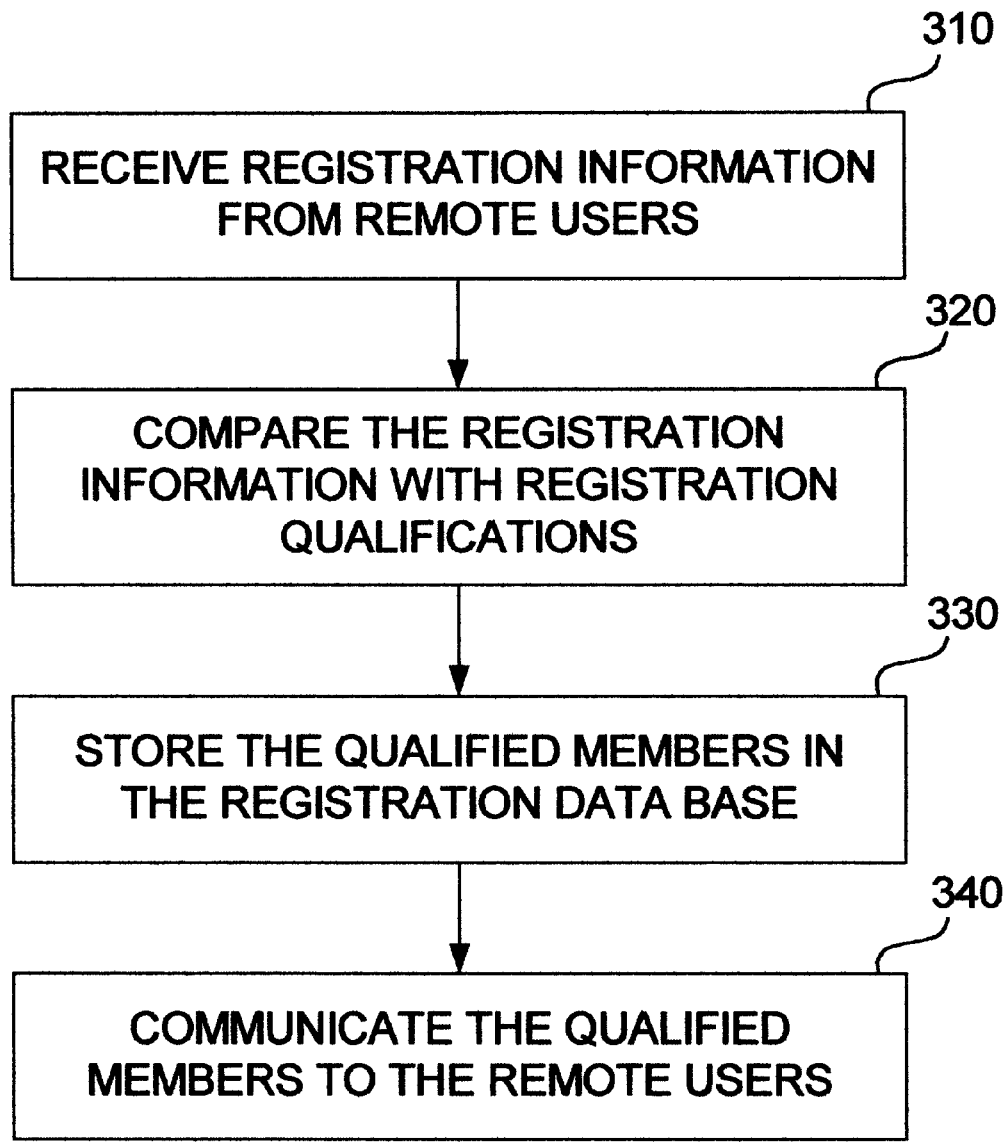
FIG. 3 shows a flow chart of the registration process according to the invention, including the registration qualification program.

The host server 100 then causes the registration qualification program 210 to be executed. FIG. 3 shows a flow chart of the registration process according to the invention, including the registration qualification program 210.

A first step 310 includes receiving registration information from the remote users. Generally, the information is input as stated above, through an organization web page. A set of response are requested on the web page, in which the remote users respond. The response information is stored in the registration database 260. Registration information can include age, gender, address and experience. In addition, the registration information can include a form of payment, like, a credit card number.

A second step 320 includes the registration qualification program 210 accessing the registration information stored in the registration database 260 and qualification information stored in the organization database 250. The registration qualification program 210 compares the registration information with the qualification information and determines whether a remote used qualifies as a qualified member. For example, a remote user who is fifteen years old will not be qualified as a member of a league for twelve year olds. Qualified members are allowed to participate in the organization.

An embodiment of the invention further includes automatically communicating to each remote user whether the remote user is qualified as a member of the league through the network 110. The communication can be in the form of an electronic mail message sent to the remote user. The electronic mail can be sent to an electronic mail address stored in the registration database at the time the remote user registers. Alternatively, the communication can be automatically displayed on a web page that is controlled by the host server 100 which the remote user is accessing.

Another aspect of the invention includes automatically generating rosters which include qualified members of the organizations, and automatically communicating the rosters to the members of the organization. Generally, generating the rosters includes executing the roster generation program 220, and accessing the registration database 260 and the roster database 270.

Figure 4:
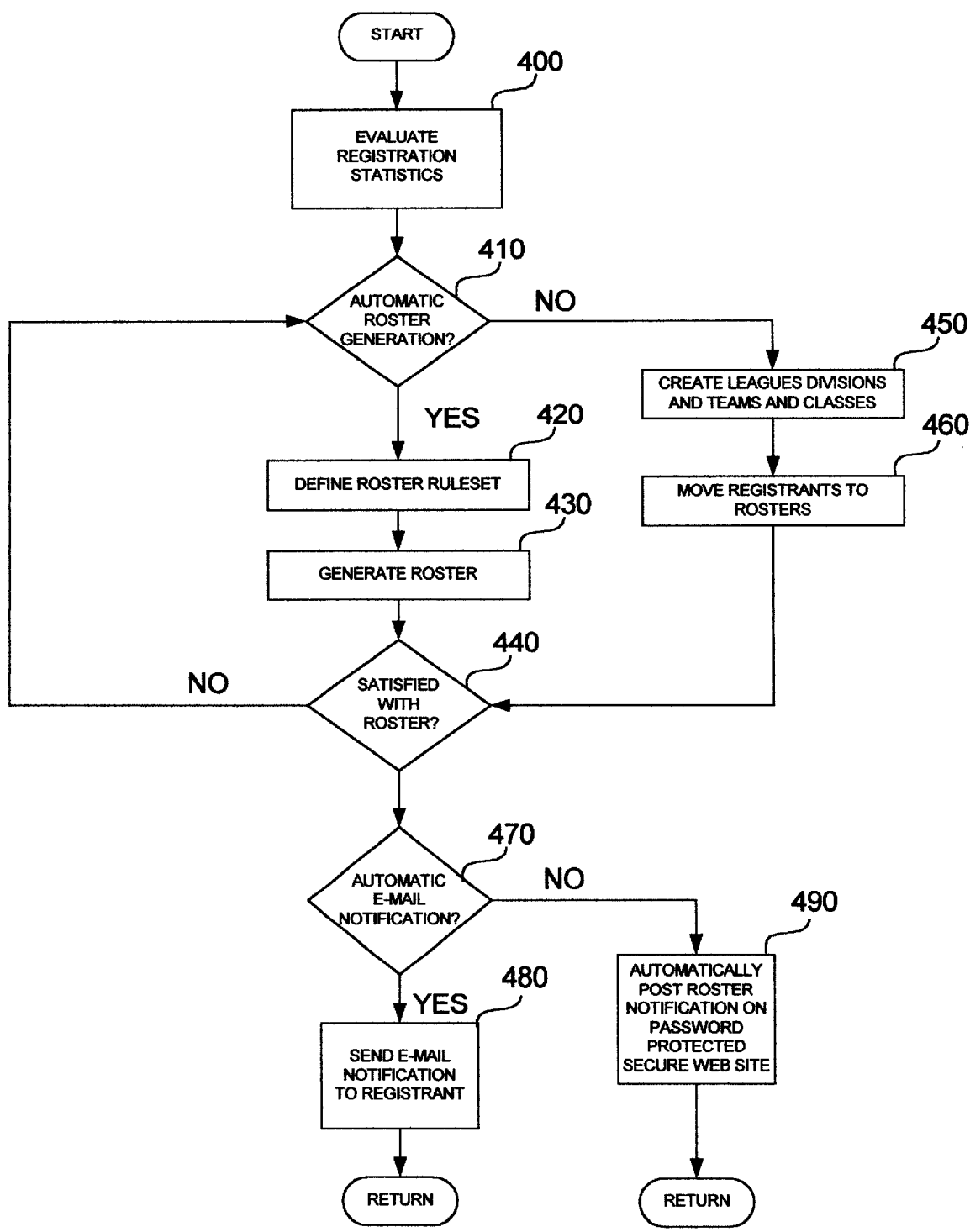
FIG. 4 is a flow chart which shows the steps included within the roster generation program 220.

FIG. 4 is a flow chart which shows the steps included within the roster generation program 220.

A first step 400 of the roster generation program 220 includes displaying registration statistics of the qualified members of the league. The registration information is stored within the registration database 260, and is easily accessible. The league administrator (system administrator) 160 can make informed decision about the organization of the league before any team rosters are generated. For example, the registration statistics can depict how many qualified members are of a particular gender, age or experience. If the league administrator observes that there are no qualified members of a particular gender or age, the league administrator can request that rosters not be generated for those particular divisions within the league.

A second step 410 includes the system administrator 160 deciding whether the roster generation program 220 should automatically generate the rosters, or whether the system administrator prefers to personally select the rosters.

If the system administrator 160 selects the rosters to be automatically generated, then a third step 420 includes the determination of a roster rule set. The roster rule set can include stipulations, for example, on the number of members to be included on a roster, the number of boys or girls to be included on a roster, the desired age distribution to be included on a team, or any other system administrator 160 defined restriction.

A fourth step 430 of FIG. 4 includes automatically generating rosters of the qualified members once a rule set has been selected. The details of the automatic roster generation of the fourth step 430 will be discussed in greater detail later.

A fifth step 440 include the system administrator 160 indicating satisfaction with the rosters which have been generated. If the system administrator 160 is not satisfied with the rosters which have been generated, then the second step 410 is repeated.

A sixth step 450 results if the system administrator 160 decides to personally select the rosters at the second step 410. The sixth step 450 includes sorting the organization members by age, school, address, or another predetermined parameter. The sorted members are listed so that the system administrator can observe the sorted lists.

A seventh step 460 includes the system administer 160 selecting rosters from the sorted lists generated by the sixth step 450.

Once rosters have been generated, the rosters must be communicated to the remote users and qualified members of the organization. An eighth step 470 determines which of two methods is used for communicating the rosters to the remote users.

A ninth step 480 represents the first method of communicating the rosters which includes sending an electronic mail message to the remote users. The electronic mail address is acquired from the remote users when the remote users enter information which is stored in the registration database 260. Each remote user has the option of printing the electronic mail message so that the remote user has a hard-copy of the roster.

A tenth step 490 represents the second method of communicating the rosters which includes the host server 100 providing access to the roster information to the remote users through the network 110. Generally, the remote users log on to a web page which is controlled by the host server 100. One of the options available on the web page is access to the rosters stored on the roster database 270. Upon accessing the roster database 270, the remote user can print a hard-copy of the roster.

Figure 5:
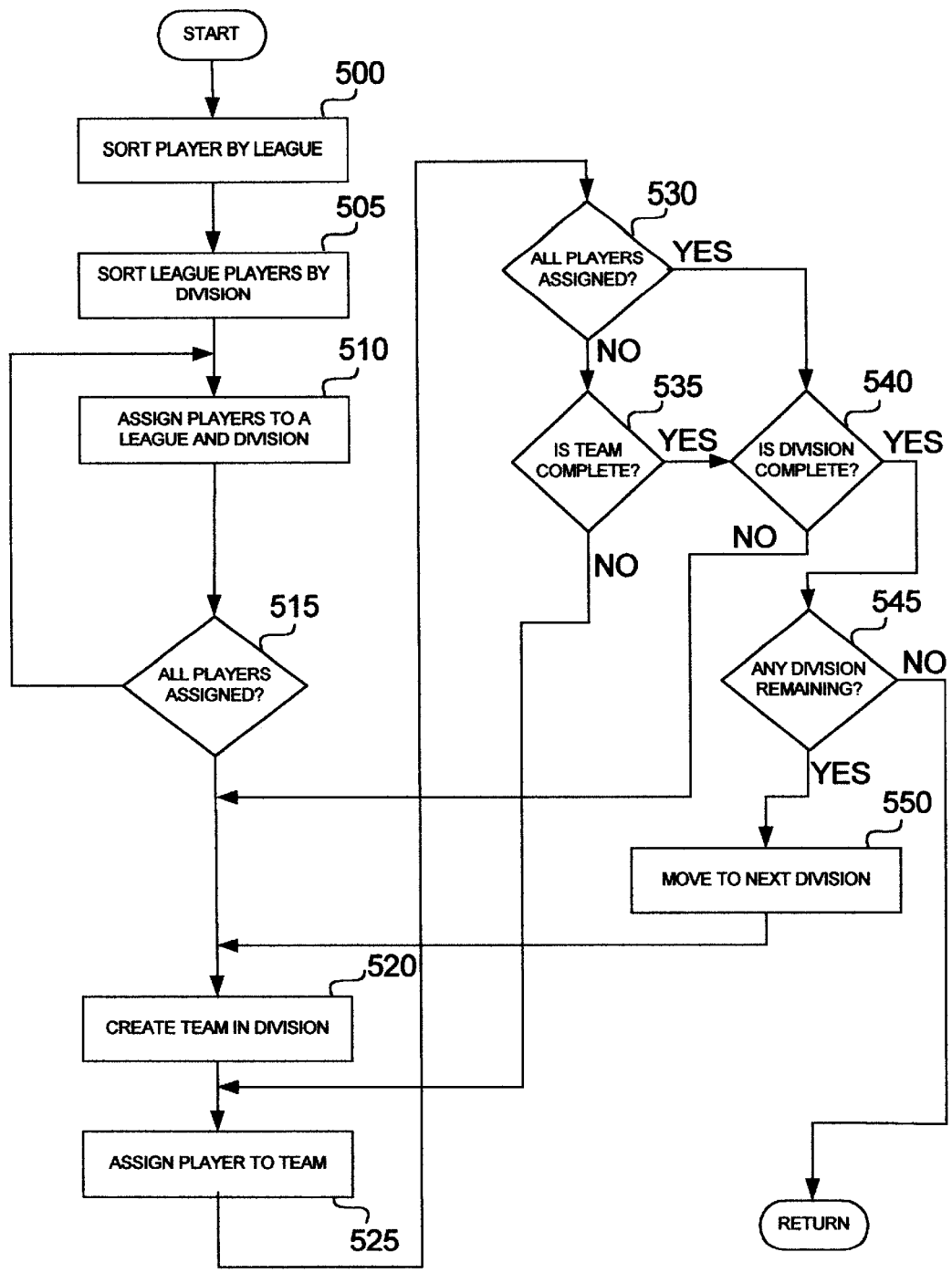
FIG. 5 is another flow chart which shows more detail of the steps included within the roster generation program 220.

FIG. 5 is another flow chart which show more detail of the steps included within the roster generation program 220. More specifically, FIG. 5 is a flow chart which shows the steps included within the fourth step 430 of FIG. 4, which includes automatically generating rosters of the qualified members based on a selected rule set.

A first step 500 include sorting the qualified members (players) of an organization into leagues. An individual league can be defined by the grade or age of the player. For example, a particular league can include seventh graders, while another league includes eighth graders.

A second step 505 includes sorting the players by division. A division can be defined by the address of the player, or by the school attended by the player. For example, a player who attends school A can be sorted into a first division while players who attends school B can be sorted into a second division.

A third step 510 includes iteratively stepping through each player of an organization and assigning the player to both a league and a division. That is, the registration information of each remote user (player) includes enough information to allow categorization of the player to a particular league and division.

A fourth step 515 includes checking to ensure that all player of the organization have been assigned to a league and a division. If all of the players have not been assigned, the third step 510 is repeated.

A fifth step 520 includes creating a team within a particular division.

A sixth step 525 include assigning a player to the last team created.

A seventh step 530 includes checking to determine whether all of the players have been assigned to a team. If all players have not been assigned, then an eighth step 535 is executed. If all of the players have been assigned, then a ninth step 540 is executed.

The eighth step 535 includes checking to determine whether the team last created is complete. That is, checking to determine whether the last team created has a complete roster of players. If the team is complete, then the ninth step 540 is executed. If the team is not complete, then the sixth step 525 is repeated.

The ninth step 540 includes checking to determine whether all of the players within a division are complete. That is, checking to determine that all of the players who have been assigned to the division, have been assigned to a team within the division. If the division is not complete, then the fifth step 520 is repeated. If the division is complete, then a tenth step 545 is executed.

The tenth step 545 includes checking to determine whether any division within the league has not had players and teams assigned to the division. If there is still at least one remaining division, then the fifth step 520 is repeated. If all of the players within every division have been assigned to a team, then the roster generation program 220 is complete.

As mentioned before, once rosters have been generated, the rosters must be communicated to the remote users and qualified members of the organization.

Figure 6:
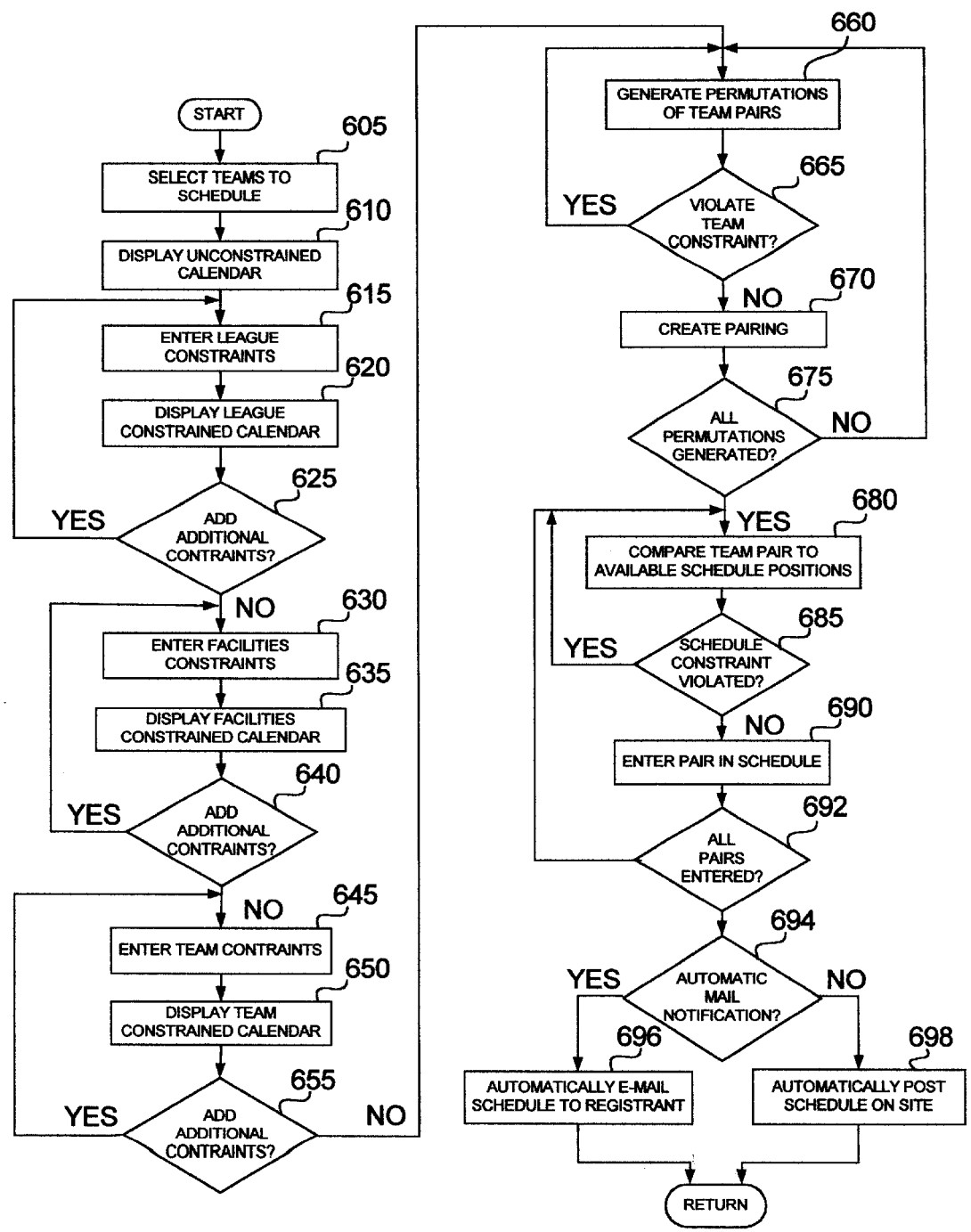
FIG. 6 is a flow chart which shows the steps included within the schedule generation program.

Another aspect of the invention includes generating a schedule of events (game schedule) of the organization and automatically communicating the schedule to the members (players) of the organization. FIG. 6 is a flow chart which shows the steps included within the schedule generation program 230.

A first step 605 includes selecting the teams (rosters) within a league and division which are to be scheduled.

A second step 610 includes displaying to the league administrator (system administrator 160) an unconstrained open calender. This step is for the convenience of the league administrator.

A third step 615 includes the league administrator entering any league constraints which may exist. League constraints can include the length of a league season, the number of games of a season and other time constraints. Time constraints can include, for example, Sundays and holidays.

A fourth step 620 includes displaying a league constrained calender to the league administrator. Again, this step is for the convenience of the league administrator.

A fifth step 625 includes prompting the league administrator for any other league constraints. If the league administrator desires to enter more constraints, the third step 615 is repeated. Otherwise, a sixth step 630 is executed.

The sixth step 630 includes the league administrator entering any facilities constraints which may exist. Here, facilities are defined here as the places where the sports activity can take place. For example, a field or gymnasium. Facilities constraints can include a facility not being available on particular dates or times.

A seventh step 635 includes displaying a facilities constrained calender to the league administrator. Again, this step is for the convenience of the league administrator.

An eighth step 640 includes prompting the league administrator for any other facilities constraints. If the league administrator desires to enter more constraints, the sixth step 630 is repeated. Otherwise, a ninth step 645 is executed.

The ninth step 645 includes the league administrator entering any team constraints which may exist. Team constraints can include a team coach not being available, a team not being available or team conflicts.

A tenth step 650 includes displaying a team constrained calender to the league administrator. Again, this step is for the convenience of the league administrator.

An eleventh step 655 includes prompting the league administrator for any other team constraints. If the league administrator desires to enter more constraints, the ninth step 645 is repeated. Otherwise, a twelfth step 660 is executed.

The twelfth step 660 includes generating permutations of pairings for a team. For example, if there are six teams to be scheduled (teams A, B, C, D, E, F), then a first team permutation pairing may be A and B. The next time the twelfth step 660 is executed, the pairing may be, for example, A and C.

A thirteenth step 665 include checking to determine whether the team pairing of the twelfth step 660 violates any of the previously determined team constraints. If a team constraint is violated by the pairing, then the twelfth step 660 is repeated. If a team constraint is not violated, then a fourteenth step 670 is executed.

The fourteenth step 670 includes designating a pairing as proper. That is, no team constraints are violated by the pairing.

A fifteenth step 675 includes checking to determine whether all pairs which do not violate team constraints have been designated as proper. That is, a determination is made whether A has been paired with B, C, D, E, F, whether B has been paired with A, C, D, E, F, as so forth through each of the teams A, B, C, D, E, F.

A sixteenth step 680 includes comparing the proper team pairings with available time slots of the schedule. That is, the schedule includes a finite number of chronologically ordered available time slots. Each pairing of a team is chronologically matched with available slots. For example, the pairing A and B may be entered in a first date and time available slot.

A seventeenth step 685 includes determining if the time slot of the schedule in which a team pairing has been matched violates any of the predetermined schedule constraints. If a scheduling constraint is violated, then the sixteenth step 680 is repeated. If no scheduling constraints are violated, then an eighteenth step 690 is executed.

The eighteenth step 690 includes, entering the team pair into the schedule date and time slot.

A nineteenth step 692 includes checking whether all of the team pair permutations have been entered into the schedule. If all of the team permutations have not been entered, then the sixteenth step 680 is repeated. If all team permutations have been entered, then a twentieth step 694 is executed.

The twentieth step 694 includes determining whether each of the remote users requested an automatic electronic mail notification. The request for electronic mail notification is made at the time the remote user registers for the league. Therefore, the request is generally stored in the registration database. If an automatic electronic mail notification was requested, then a twenty first step 696 is executed. If an automatic electronic mail notification was not requested, then a twenty second step 698 is executed.

The twenty first step 696 includes sending an electronic mail message to the remote users. The electronic mail address is acquired from the remote users when the remote users enter information which is stored in the registration database 260. Each remote user has the option of printing the electronic mail message so that the remote user has a hard-copy of the schedule.

The twenty second step 698 includes the host server 100 providing access to the schedule information to the remote users through the network 110. Generally, the remote users log on to a web page which is controlled by the host server 100. One of the options available on the web page is access to the schedules stored on the schedule database 280. Upon accessing the schedule database 280, the remote user can print a hard-copy of the schedule.

Another aspect of the invention includes generating a product list for the organization members (players) which includes products which are useful to the activities of the organization, and automatically communicating the product list through the network 110 to organization members (players).

Figure 7:
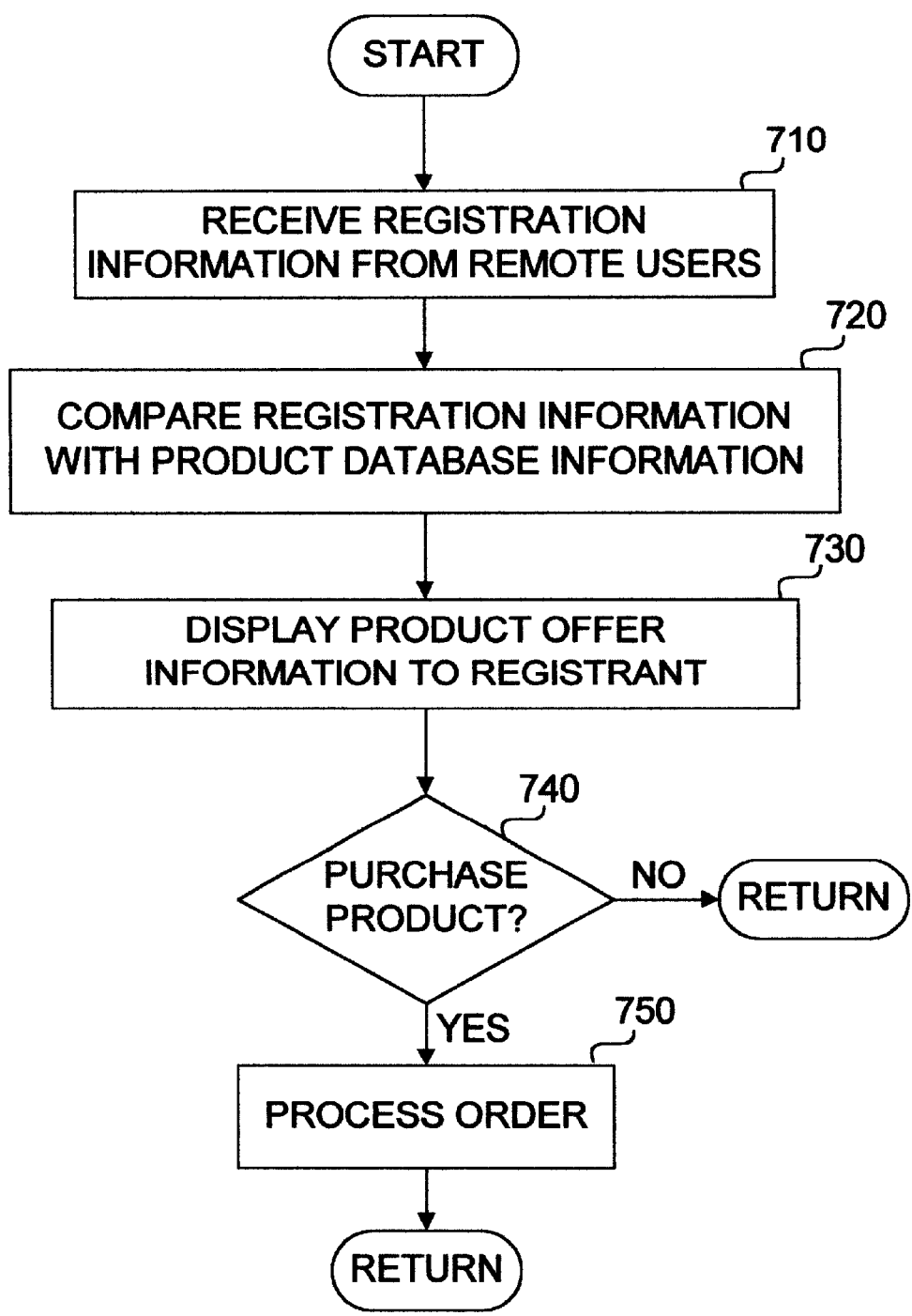
FIG. 7 is a flow chart which shows the steps included within the product generation program.

FIG. 7 is a flow chart which shows the steps included within the product generation program 240.

A first step 710 includes receiving the registration information from the remote users. This functionality to a large extent is included within the registration qualification program 210.

A second step 720 includes comparing the registration information of the remote users to product information stored within the product database. Certain registration characteristics trigger the product generation program 240 to provide lists of particular products which are stored in the product database. For example, a remote user who is registering for a football league may have products like cleats, a football or a mouth guard listed. A remote user who is registering for a baseball league may have products like a glove, a bat or a hat listed. In addition, other types of products and services may be offered. For example, team pictures may be listed, or private batting lessons from an instructor may be listed. Essentially, any product or service that a participant of the league may be interested in purchasing may be listed on the product list.

A third step 730 includes displaying the product list to the remote user. As with previously describe automatic communication with the remote users, the process of displaying the product list to the remote users can include individual electronic mail messages, or it can include displaying the product list on a web page controlled by the host server 100 which the remote user is currently viewing.

A fourth step 740 include receiving any request by the remote users to purchase a product on the product list. The product request are generally made over the computer network 110. If no request are made, then the product generation program 240 is done. If request(s) are received, then a fifth step 750 is executed.

The fifth step 750 includes processing the product request of the remote users. Basically, this includes completing an order for a product. This can be accomplished by communicating the order to the manufacturer of the product through the network 110. Further, payment of the product can be completed simultaneous with the request. For example, the remote user can enter a credit card number which provides payment for the good or services requested by the remote user.

Although specific embodiments of the invention have been described and illustrated, the invention is not to be limited to the specific forms or arrangements of parts so described and illustrated. The invention is limited only by the claims.

What is claimed:

1. A group organizational system operational as a computer program on a computer network, the computer network providing communication between a host server and a plurality of remote users, the group organizational system comprising:

an organization database in communication with the host server, the organization database comprising information relevant to an organization, and predetermined registration qualifications;

a registrant database in communication with the remote users and in communication with the host server, the registrant database receiving registration information from the remote users, a roster database in communication with the host server;

the host server comprising:

a registration generation program for automatically comparing the registration information of the remote users with the predetermined registration qualifications to determine whether a remote user qualifies as a member of the organization;

means for automatically communicating through the computer network to each of the remote users whether the remote user is qualified as a member of the organization;

means for updating the registration database to indicate whether a remote user is qualified as a member of the organization;

a roster generation program for automatically generating a plurality of rosters comprising the members of the organization, based upon the registration information of the members of the organization;

means for storing the rosters in the roster database;

means for automatically communicating the rosters through the computer network to the remote users;

a schedule database in communication with the host server;

a schedule generation program for automatically generating a schedule of events of the organization based upon the rosters and predetermined scheduling restraints, means for storing the schedule of events on the schedule database; and means for automatically communicating the schedules through the computer network to the remote users.

2. The group organizational system of claim 1, further comprising:

a product database in communication with the host server, the product database comprising product information about products relevant to the organization;

a product generation program for generating a product list based upon the registration information of the remote users and the product information of the product database;

means for automatically communicating the product list through the computer network to the remote users.

3. The group organizational system of claim 2, wherein the product generation program for automatically generating a product list based upon the registration information of the remote users and the product information of the product database comprises:

comparing the registration information of the remote users with the product information within the product database;

displaying product information related to the registration information of each remote user to each remote user; and receiving requests from the remote users for products which are displayed to the remote users.

4. The group organizational system of claim 3, wherein the product generation program for automatically generating a product list based upon the registration information of the remote users and the product information of the product database further comprises:

ordering products requested by the remote users.

5. The group organizational system of claim 1, wherein the roster generation program for automatically generating a plurality of rosters comprising the members of the organization comprises:

receiving roster rule set parameters from a group organization administrator;

generating the roster based upon the roster rule set parameters and the members of the organization;

receiving acceptance of the generated roster from the group organization administrator.

6. The group organizational system of claim 5, wherein the roster generation program for generating a plurality of rosters comprising the members of the organization further comprises:

sorting members of the organization by leagues;

sorting members of the organization into divisions within the leagues;

creating teams within the divisions assigning members of the organization to teams until all members of the organization are assigned to teams of the divisions.

7. The group organizational system of claim 1, wherein the roster generation program for automatically generating a plurality of rosters comprising the members of the organization comprises:

sorting the members of the organization by common characteristics between the members;

receiving roster selections from a group organization administrator;

receiving acceptance of the roster selections from the group organization administrator.

8. The group organizational system of claim 1, wherein the means for automatically communicating the rosters through the computer network to the remote users comprises:

sending an electronic message to each of the remote users, the electronic message comprising qualified members information and the rosters.

9. The group organizational system of claim 1, wherein the means for automatically communicating the rosters through the computer network to the remote users comprises:

storing rosters on the roster database, wherein the roster database is accessible by the remote users through the computer network.

10. The group organizational system of claim 9, wherein the rosters stored on the roster database are accessible through the computer network to the remote users through a web page which is controlled by the host server.

11. The group organizational system of claim 1, wherein the schedule generation program for automatically generating a schedule of events of the organization based upon the rosters and predetermined scheduling restraints comprises:

selecting rosters to schedule;

receiving scheduling constraints from a league administrator;

displaying a calendar which includes available schedule slots and the scheduling constraints to the league administrator;

creating permutations of pairs of rosters entering the permutation of pairs of rosters in available schedule slots to create roster schedules; and automatically communicating the roster schedules over the computer network to the remote users.

12. The group organizational system of claim 11, wherein automatically communicating the roster schedules over the computer network to the remote users comprises:

sending an electronic message to each of the remote users, the electronic message comprising the roster schedules.

13. The group organizational system of claim 11, wherein automatically communicating the roster schedules over the computer network to the remote users comprises:

storing the roster schedules on the schedule database, wherein the schedule database is accessible by remote users through the computer network.

14. A computer network implemented group organizational method for receiving, organizing and processing registration information of a plurality of remote users, the computer network providing communication between a host server and the remote users, the group organizational method comprising:

receiving registration information from the remote users and storing the registration information within a registrant database;

automatically qualifying each remote users as an organization member if the registration information of the remote user stored within the registrant database satisfies predetermined criteria as stored within an organization database;

automatically generating rosters of the organization members depending upon the registration information;

automatically communicating over the computer network whether each remote user has been qualified as an organization member, and the rosters;

automatically generating a schedule of events of the organization based upon the rosters and predetermined scheduling restraints;

storing the schedule of events on a schedule database; and automatically communicating the schedules through the computer network to the remote users.

15. The computer network implemented group organizational method of claim 14, further comprising:

automatically generating a product list based upon the registration information of the remote users and product information stored within a product database;

automatically communicating the product list through the computer network to the remote users.

16. The computer network implemented group organizational method of claim 14, wherein the step of automatically generating rosters of the organization members depending upon the registration information comprises:

receiving roster rule set parameters from a group organization administrator;

generating the roster based upon the roster rule set parameters and the members of the organization;

receiving acceptance of the generated roster from the group organization administrator.

17. The computer network implemented group organizational method of claim 16, wherein the step of automatically generating the roster comprises:

sorting members of the organization by leagues;

sorting members of the organization into divisions within the leagues;

creating teams within the divisions assigning members of the organization to teams until all members of the organization are assigned to teams of the divisions.

18. The computer network implemented group organizational method of claim 14, wherein the step of automatically communicating over the computer network whether each remote user has been qualified as an organization member, and the rosters comprises:

sending an electronic message to each of the remote users, the electronic message comprising qualified organization members information and the rosters.

* * * * *